United States Patent Office 2,773,052
Patented Dec. 4, 1956

2,773,052

COPOLYMERS OF PROPENYLBENZENE

Lester S. Cohen, Albert P. Giraitis, and Joseph R. Zietz, Jr., Baton Rouge, La., assignors to Ethyl Corporation, New York, N. Y., a corporation of Delaware No Drawing. Application July 1, 1953,
Serial No. 365,534

5 Claims. (Cl. 260—88.1)

This invention relates to the production of new materials having characteristic highly desirable plastic properties and which are suitable for moldings, coatings, castings, electrical insulations, adhesives, fibers, foam or sponge rubber products and the like. More particularly, the invention concerns the copolymerization of propenylbenzene with other polymerizable monomers and products obtained therefrom.

Propenylbenzene (beta methyl styrene) is a well known compound. The homopolymerization of this compound has previously been reported (Annalen der Chemie 517, 73–104). However, only very low molecular weight materials were obtained having little or no commercial value. Propenylbenzene, in contrast to styrene and alpha methyl styrene, is extremely unreactive and very difficult to polymerize. For example, propenylbenzene cannot be polymerized even after contact for several days with such catalysts as stannic chloride, aluminum bromide, aluminum chloride and titanium tetrachloride, each of which polymerizes styrene and alpha methyl styrene almost instantaneously.

It is accordingly an object of this invention to provide a new class of polymerized compounds which have substantially improved properties over known polymers or copolymers and particularly over the prior known propenylbenzene homopolymer. Another object is to provide copolymers of propenylbenzene with other copolymerizable monomers, i. e., ethylenic type monomers, which retain many of the characteristic desirable properties of the propenylbenzene type structure while at the same time retaining or modifying the desirable properties of the ethylenic monomers with which they are copolymerized. Still another object is to provide copolymers having extremely high softening points and exceptional thermal stability. Another object is to provide a process for the production of these novel copolymers.

The copolymers of this invention comprise propenylbenzene and one or more other polymerizable monomers. Propenylbenzene has the following structural formula:

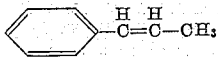

Propenylbenzene can be prepared by several methods including the isomerization of allylbenzene in the presence of alkaline catalysts, as is reported in German Patent No. 154,654. Likewise, propenylbenzene can be manufactured from benzaldehyde and ethyl bromide, using a Grignard reaction, which reaction yields ethyl phenyl carbinol that can in turn be dehydrated to produce propenylbenzene, according to the procedures of Klages (Ber. 35, 2251, 1902). However, a more preferred method of preparation comprises the reduction of ethyl phenyl ketone using an alkali borohydride, i. e., sodium and potassium borohydrides, to yield the ethyl phenyl carbinol which can thereafter be dehydrated as noted above, to produce the propenylbenzene. The use of the alkali borohydride as the reducing reagent has several advantages over reducing agents such as aluminum iso-propoxide, or hydrogen including the elimination of side or waste products and the provision of an extremely fast reduction reaction. The dehydration can be carried out using a wide variety of dehydrating agents such as sulfuric acid, phosphorus pentoxide, and the like. However, substantially improved results have been obtained when employing a vapor phase dehydration above about 250° C. and normally below about 600° C. A more preferred dehydration temperature range is between 300° C. and 400° C. with best results being obtained between 360° C. and 380° C.

The dehydration reaction can be carried out over a wide range of pressures including either sub-atmospheric, atmospheric, and super-atmospheric pressure. Normally, it is preferred to carry the dehydration out at an absolute pressure between about 25–500 mm. of mercury and preferably between 50 and 150 mm.

The catalysts for the vapor phase dehydration include metal oxides such as alumina, magnesia, zinc oxide, silica, and silica gels, bauxite, molybdena, and the like.

The above monomer can be copolymerized with one or more of the other polymerizable monomers in a wide range of concentrations. Generally, a weight proportion between about 0.1 and 99.9 weight percent of propenylbenzene and between about 99.9 to about 0.1 weight percent of another or a combination of other comonomers is employed. The proportion of the individual monomers can be varied to produce copolymers having varying properties and the exact proportions used are dependent upon the type of copolymer desired.

The comonomers suitable for copolymerization with propenylbenzene have the general formula

wherein $R_1$, $R_2$, $R_3$, and $R_4$ are members of the group consisting of hydrogen, alkyl, cycloalkyl, aryl, alkaryl, arakyl, alkoxyalkyl, halogen, alkenyl, carboalkoxy, acetyl, cyano, esters, carboxy, amido, aldehydo, alkenyloxy, alkynyl, thienyl, furanyl, tetrahydrofuranyl, pyranyl, and higher heterocyclic groups.

Typical examples of the above radicals for $R_1$, $R_2$, $R_3$, and $R_4$ are methyl, ethyl, propyl, butyl, cyclopentyl, cyclohexyl, phenyl, halogenophenyl, nitrophenyl, tolyl, xylyl, ethylphenyl, benzyl, phenylethyl, methylbenzyl, methoxy, ethoxy, methoxymethyl, ethoxymethyl, fluoro, chloro, bromo, iodo, vinyl, chlorovinyl, carbomethoxy, carboethoxy, acetyl, propionyl, cyano formoxy, acetoxy, propionoxy, carboxy, amido, vinyloxy, allyloxy, ethynyl, furanyl, pyridyl, carbazyl, indolyl, indenyl, pyrrolyl, pyrrolidinyl, pyrrolidonyl, etc.

Other monomers which are also suitable for copolymerization with propenylbenzene are unsaturated cyclic compounds, such as indene, dioxene, dithiene, dioxadiene, coumarone, etc.

Specific examples of suitable comonomers for copolymerization with propenylbenzene are ethylene, propylene, isobutylene; dienes, such as butadiene, isoprene, 2,3-dimethylbutadiene, dimethyl pentadiene, cyclopentadiene, etc.; halogenated olefins and multiolefins such as 2-halogenobutadienes; esters of unsaturated alcohols with mono- and polybasic saturated and unsaturated acids, such as vinyl acetate, allyl acetate, diallyl maleate, etc.; esters of saturated alcohols with mono- and polybasic unsaturated acids, such as methyl acrlyate, ethyl acrylate, methyl methacrylate, ethyl methacrylate, haloacrylates, diethyl maleate, diethyl fumarate, etc.; unsaturated ethers, such as divinyl ether, diallyl ether, vinyl alkyl ethers, allyl alkyl ethers; unsaturated nitriles such as acrylonitrile, methacrylonitrile, haloacrylonitriles, phenyl acrylonitriles, vinylidene cyanide, etc.; unsaturated amides such as acrylamide, methacrylamide; N-substituted unsaturated amides, e. g., N,N-dimethyl acrylamide, N,N-diethylacrylamide, N-methylacrylamide, etc.; unsaturated acids and anhydrides such as acrylic acid, methacrylic acid, crotonic acid, itaconic acid, maleic anhydride, etc.; unsaturated ketones such as divinyl ketone, vinyl alkyl ketones, etc.; unsaturated aldehydes and acetals, such as acrolein and its acetals, methacrolein and its acetals, etc.; unsaturated aromatic compounds such as divinyl benzene, styrene, mono- and polyhalo styrenes, alkyl styrene, cyano styrene, vinyl naphthalene, etc.; unsaturated heterocyclic compounds such as vinyl pyridine, vinyl furan, vinyl coumarone, vinyl dibenzofuran, N-vinyl carbazole, etc.; unsaturated alicyclic compounds such as vinyl cyclopentane, vinyl cyclohexane, etc.; unsaturated alcohols such as 2-methallyl alcohol, allyl alcohol, etc.; and unsaturated sulfides, sulfoxides, sulfones, sulfites, sulfates, sulfonates, phosphines, phosphites, phosphates, phosphonates and silanes.

The above new copolymers can be produced by acid type polymerization. The polymerization can be carried out with a catalyst selected from the group of Friedel-Crafts types consisting of boron trifluoride, aluminum bromide-hydrogen bromide, and aluminum halide with the corresponding alkyl halide. The aluminum halides suitable are the chloride, bromide, and alkyl halides include the lower aliphatic halides, i. e., methyl, ethyl, etc.

The catalyst concentrations are not critical, although it is preferred to use concentrations of catalytic quantity. Suitable results can be obtained using from about 0.001 to about 100 or more mole percent, based upon the total concentration of the monomer, although a concentration of between about 0.1 and 5 percent by weight based upon the total amount of monomer is preferred. When employing a promoted catalyst or other modified catalyst, such as the mixtures of the above catalysts, i. e., aluminum bromide-hydrogen bromide, substantially higher concentrations are suitable and frequently preferred. In such cases, the catalyst concentration can be equal to or sometimes greater than the actual concentration of the monomers. In general, these catalysts are destroyed in subsequent treatment of the polymer, following polymerization, but, when excess quantities are employed, these quantities can be recovered by known means.

The temperature of the acid type polymerization is important but again not critical. A suitable range is between about −190° C. up to about 150° C. Generally, however, if solid or semi-solid high molecular weight polymers are desired, lower polymerization temperatures are preferred, normally below about 0° C. and preferably below about −100° C.

The above copolymers should preferably have an average molecular weight above about 2,500, although it is preferred to have molecular weights above 10,000 and frequently above 30,000. Of course, with such molecular weights, the molecular weight of the different fractions vary from relatively low molecular weights to very high molecular weights. The molecular weight can be controlled by controlling the reaction conditions and/or the catalyst type and concentration or polymerization technique employed. Of course, the most desirable molecular weight is somewhat dependent upon the particular copolymer desired and the concentration of the propenylbenzene in the comonomers. In general, lower temperatures favor the formation of higher molecular weight copolymers. With copolymers of propenylbenzene and isobutylene, for example, molecular weights of 20,000, 30,000, 40,000, 50,000, 60,000, and 100,000 give highly useful properties to the copolymer. Likewise, similar molecular weights are desirable for copolymers of propenylbenzene with several of the other comonomers noted above. The following are a list of specific examples of copolymers in accordance with this invention. In each case, the percent listed is that of the propenylbenzene. With several of the copolymers, notably in the case of isobutylene, butadiene, and styrene, a plurality of examples of different concentrations are given for each copolymer.

| Monomer | Comonomer | Monomer, percent/weight |
|---|---|---|
| Propenylbenzene | Propylene | 50. |
| Do | Isobutylene | 2, 5, 10, 20, 40, 60, 80, 85, 90, 95, 97. |
| Do | Isoamylene | 50. |
| Do | α-Methyl styrene | 50. |
| Do | p-Isopropenyltoluene | 50. |
| Do | Vinyl ethyl ethers | 50. |
| Do | Methyl vinyloxyacetate | 50. |
| Do | Styrene | 2, 5, 10, 20, 40, 60, 80, 85, 90, 95, 97 |
| Do | Butadiene | 2, 5, 10, 20, 40, 60, 80, 85, 90, 95, 97. |
| Do | Divinyl ether | 50. |
| Do | Methyl vinyl ketone | 50. |
| Do | N-Vinyl pyrrolidine | 50. |
| Do | N-Vinyl carbazole | 50. |
| Do | Methyl methacrylate | 2, 5, 10, 20, 40, 60, 80, 85, 90, 95, 97. |
| Do | p-Chlorostyrene | 50. |
| Do | 2,5-Dichlorostyrene | 50. |
| Do | p-Methyl styrene | 50. |
| Do | Diethyl fumarate | 50. |

The following are examples of terpolymers including propenylbenzene as one of the monomers:

| $M_1$ | $M_2$ | $M_3$ | $M_1$, $M_2$, $M_3$ (parts by wt.) |
|---|---|---|---|
| Propenyl-benzene | Isobutylene | Butadiene | 10/50/40 2/90/8 |
| Do | do | Styrene | 10/50/40 2/90/8 |
| Do | Butadiene | do | 10/20/70 |

The following are specific examples of the preparation of copolymers in accordance with the present invention, all quantities being given in parts by weight.

*Example I*

|   | Parts |
|---|---|
| Propenylbenzene | 5 |
| Isobutylene | 95 |
| Ethyl chloride | 260 |

The above materials were placed in a reaction vessel and cooled to a temperature of −100° C. Boron trifluoride was introduced into the reaction vessel from a cylinder until the solution was saturated. The reactants were continuously stirred during the addition of the catalyst. To the deep, orange slurry so-formed, 25 parts of methanol and one part of ammonium hydroxide were added to destroy the excess catalyst and catalyst complex. Upon raising the temperature of the reaction mixture to room temperature, the ethyl chloride vaporized and was removed from the system. The resulting white polymer was reprecipitated from a benzene solution by the addition of excess methanol. The polymer was dried at 40° C. under a vacuum of 25 inches of water for twenty-four hours. The so-treated polymer was extremely tacky and was very suitable as an adhesive. After standing for several months, the adhesive properties were not affected. No discoloration or oxidation was apparent.

*Example II*

|   | Parts |
|---|---|
| Propenylbenzene | 2.5 |
| Butadiene | 7.5 |
| Ethyl chloride | 20 |

The above materials were reacted in accordance with Example I above except that the temperature was maintained at −110° C. The copolymer obtained in this example had excellent hydrocarbon resistance, being insoluble in benzene, xylene, butylene, ether, etc.

Example III

| | Parts |
|---|---|
| Isobutylene | 5 |
| Propenylbenzene | 5 |
| Ethyl chloride | 20 |

The above materials were reacted in accordance with Example I above except that the temperature was maintained at −110° C. A tacky solid polymer was obtained.

Example IV

| | Parts |
|---|---|
| Propenylbenzene | 10 |
| Styrene | 90 |
| Ethyl chloride | 110 |

The above materials were reacted in accordance with Example I. A hard white polymer with exceptional thermal stability and high softening point was obtained.

Example V

| | Parts |
|---|---|
| Propenylbenzene | 10 |
| Methyl vinyl ketone | 10 |
| Ethyl chloride | 150 |

The above materials were reacted in accordance with Example I, above except that the temperature was maintained at −110° C.

Example VI

| | Parts |
|---|---|
| Propenylbenzene | 10 |
| Methyl methacrylate | 10 |
| Ethyl chloride | 150 |

The above materials were reacted in accordance with Example I above except that the temperature was maintained at −110° C.

Example VII

| | Parts |
|---|---|
| Propenylbenzene | 5 |
| Isobutylene | 45 |
| Butane | 200 |

The above materials were placed in a reaction vessel and cooled to a temperature of −100° C. A mixture of one part anhydrous aluminum bromide and 0.5 part anhydrous hydrogen bromide in 50 parts of butane was added to the reaction vessel. The reactants were continuously stirred during the addition of the catalyst. The copolymer thus prepared was treated and isolated as in Example I above. The copolymer obtained in this example was a rubbery solid.

Example VIII

| | Parts |
|---|---|
| Propenylbenzene | 25 |
| Styrene | 25 |
| Butane | 200 |

The above materials were reacted in accordance with Example VII above except that the anhydrous hydrogen bromide was replaced by one part ethyl bromide. The copolymer thus obtained was a high melting thermally stable solid.

As pointed out previously, the addition of propenylbenzene to the copolymer materially improved the heat stability of various known polymerizable materials. This addition considerably raises the softening and melting points of many of the previously known low melting plastic materials. Thus, low melting thermoplastics such as polymers of styrene, isobutylene, and butadiene can be materially improved by even the addition of relatively small quantities of propenylbenzene while at the same time retaining the many and varied desirable physical properties of the known polymers. For example, when styrene is copolymerized with only 10 weight percent of propenylbenzene, thte melting point of the resulting copolymer is raised to between 140° to 160° C. as compared with the normally very low melting point of pure polystyrene.

We claim:

1. A copolymer of propenylbenzene and another polymerizable monomer selected from the group consisting of isobutylene and styrene, said copolymer being formed at a temperature between about −190° C. and 150° C. and in the presence of a Friedel-Crafts catalyst selected from the group consisting of boron trifluoride and a mixture of an aluminum halide and the corresponding halide acid, said propenylbenzene being present in said copolymer in a concentration of from about 2 to about 97 percent by weight, the balance of said copolymer being said polymerizable monomer.

2. The copolymer of claim 1 wherein the polymerization temperature is below about 0° C.

3. The copolymer of claim 1 wherein the polymerization temperature is below about −100° C.

4. The copolymer of claim 1 wherein the other polymerizable monomer is isobutylene.

5. The copolymer of claim 1 wherein the other polymerizable monomer is styrene.

References Cited in the file of this patent

UNITED STATES PATENTS

| 2,383,084 | Rummelsburg | Aug. 21, 1945 |

FOREIGN PATENTS

| 743,302 | France | Jan. 6, 1933 |